United States Patent [19]

De Jager et al.

[11] Patent Number: 4,741,049
[45] Date of Patent: Apr. 26, 1988

[54] AUTOMATIC CHANNEL SELECTING SYSTEM USING SHARED DUPLEX CHANNELS

[75] Inventors: Johan B. De Jager; John R. Reynders, both of Hilversum, Netherlands

[73] Assignee: U.S. Philips Corp., New York, N.Y.

[21] Appl. No.: 932,967

[22] Filed: Nov. 20, 1986

[30] Foreign Application Priority Data

Dec. 9, 1985 [NL] Netherlands ............... 8503382

[51] Int. Cl.⁴ ................... H04Q 7/00; H04B 1/00
[52] U.S. Cl. ........................ 455/32; 455/34; 455/54
[58] Field of Search ........... 455/32, 34, 38, 53, 455/54, 56, 58; 379/59; 370/24

[56] References Cited

U.S. PATENT DOCUMENTS 3,535,636 10/1970 Muilwijk ..................... 455/32
4,409,687 10/1983 Berti et al. ................. 455/32

Primary Examiner—Robert L. Griffin
Assistant Examiner—Curtis Kuntz
Attorney, Agent, or Firm—David R. Treacy

[57] ABSTRACT

A plurality of duplex channel pairs are shared by a number of stations having equal priority for calling other stations in the system. In resting condition, the station receiver section scans channels allocated to this station's use, in a search to identify transmission by a calling station of the address code assigned to the station which is in the rest condition. When a call is to be initiated by a station, the station searches the receiving channels for that station, to locate a free channel. Upon finding one, the called station's address code is transmitted over the duplex channel corresponding to that free receiving channel. Upon identification of its address code, the called station transmits, on what had been the free channel, a verification signal unless the called station has identified signals from yet another station being transmitted on the same channel used for transmission by the calling station. To avoid co-channel assignment, the called station will transmit a negative verification signal.

10 Claims, 1 Drawing Sheet

AUTOMATIC CHANNEL SELECTING SYSTEM USING SHARED DUPLEX CHANNELS

BACKGROUND OF THE INVENTION

The present invention relates to a method of sharing duplex channels in an automatic channel selection system; and more specifically, to a method of sharing a predetermined number of duplex channels in a frequency band of an automatic selection system. The stations comprising this system continuously scan all the receiving channels in the duplex band assigned to them, in the resting condition, each searching for its own address code. The signalling phase for setting up a connection between a first (calling) station and a second (called) station includes the following steps: the calling station stops the aforesaid scanning process and searches for a free receiving channel; after such a channel has been found, the transmitter of the calling station starts transmitting at the frequency of the relevant duplex channel over which, subsequently, the address code of the called station is transmitted; as soon as the called station recognizes its own address code, this station will stop the aforesaid scanning process carried out thus far, after which its transmitter will start transmitting on the relevant duplex channel a vertification signal to the calling station; after verification by the calling station the connection will be established and information can be exchanged.

The invention further relates to an automatic channel selection system for sharing a predetermined number of duplex channels in a frequency band in which the aforesaid method is realised. The channel selection system comprises a plurality of stations, each of which is provided with a duplex transmit/receive arrangement; scanning circuits for scanning all the receiving channels in the duplex band assigned to that station, searching for the address code assigned to the relevant station; a first switching circuit for rendering the scanning circuits inoperative when a connection to another station is to be initiated or if the address code assigned to the relevant station is recognised; and a second switching circuit to activate the transmitter when a free receiving channel has been found for a possible connection to be set up to another station or if a verification signal is to be transmitted after the address code assigned to the relevant station has been recognized.

Such a method and such an automatic channel selection system can be utilized for wireless telephone sets and mobile radio services without central control.

When applying the aforesaid method, problems may arise: if there is a connection between a first and a second station of the system over duplex channels at certain frequencies and a connection is to be set up between a third and a fourth station of the system over duplex channels at these frequencies, while the calling station of the latter pair is unable for whatever reason to receive signals transmitted by the calling station of the former stations whose transmission frequency corresponds to the frequency which the receiving channel of the calling station is tuned to, this called station will receive signals from both the calling station and either one of the former stations provided that the called station of the latter pair is not only within the range of the calling station but also within the range of either one of the former stations. If the signals of the calling station are received stronger than those from either of the former stations, a connection is realised between the third and fourth stations, which connection may become useless by mutilation and may disturb the conversation in progress over the connection between the first and second stations such that this connection has to be broken off.

SUMMARY OF THE INVENTION

The invention has for its object to avoid a "busy" channel, that is to say the existing connection between the first and the second station, not being recognised as such and more specifically in the situation outlined above also to prevent a connection from being effected between a third and a fourth station (commonly referred to as co-channel assignment).

According to the invention, in a method as described in the first two paragraphs, in the signalling phase a listening slot is provided for the called station to listen to any signals from stations other than the calling station coming in over the relevant duplex channel after which a negative verification signal is transmitted if such signals are received, as a result of which no connection is effected on the relevant channel between the calling station and the called station.

According to a further aspect of the invention an automatic channel selection system is provided as likewise described above, characterized in that third switching circuits are provided to at least interrupt the transmission signal from the relevant station when acting as the calling station, when the called station has recognized its assigned address code transmitted by the calling station.

According to the invention, the listening slot can be realised in two manners. The tramsmitter, by means of which the address code of the called station is transmitted through the relevant duplex channel, can operate intermittently in the signalling phase. Consequently, the address code is always transmitted after a certain rest period. In general, a plurality of listening slots will be generated before the called station recognizes its own address and transmits a verification signal. It is, however, alternatively possible that the moment when the called station recognizes its own address code it supplies a control signal to the calling station through the relevant duplex channel, after which the calling station stops transmitting the transmission signals containing the address code of the called station. In that case the listening time is realised non-recurrently and is initiated by the called station; however, this calls for an additional message signal, that is to say the control signal, compared with the first method.

The invention and its advantages will be described in greater detail by way of example with reference to the accompanying drawing.

DESCRIPTION OF THE PREFERRED EMBODIMENT

Figure 1:
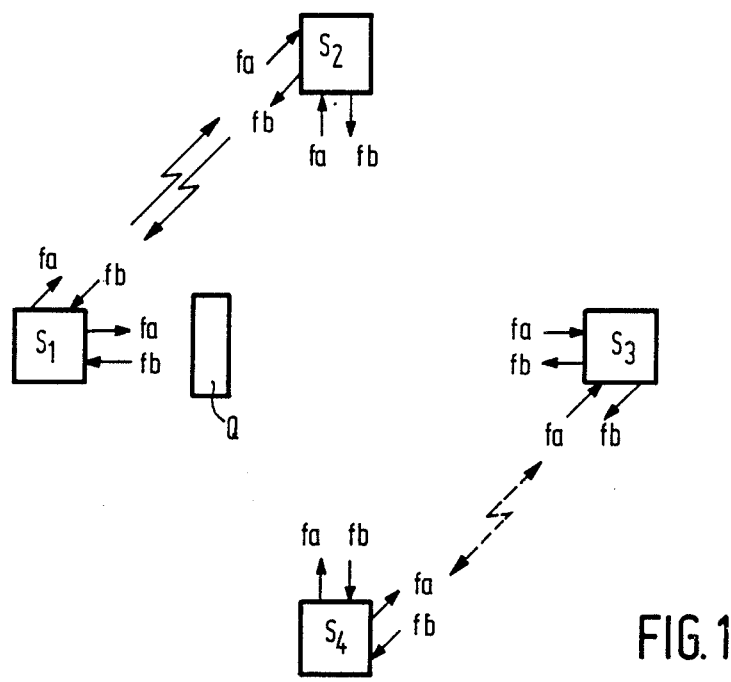
FIG. 1 shows a lay-out of four stations belonging to an automatic channel selection system.

In the automatic channel selection system shown in FIG. 1 four stations S1, S2, S3 and S4 are represented, each provided with duplex channels tuned to the frequencies fa and fb. The S1 and S4 transmission channels as well as the S2 and S3 receiving channels are tuned to the frequency fa; the S2 and S3 transmission channels as well as the S1 and S4 receiving channels are tuned to the frequency fb. A connection has been set up between the stations S1 and S2. As long as the stations S3 and S4 are in the resting condition, commonly called the search phase, they continuously scan the receiving channels in the duplex band assigned to them, each searching for its own address code.

Let it be assumed that the station S3 wishes to set up a connection with station S4. Station S3 will then stop the scanning process carried out thus far and listen to determine whether the receiving channel tuned to the frequency fa is free. If the two stations S3 and S4 of the connection to be set up are situated outside the radio range of the already existing connection between S1 and S2, S3 will find that its receiving channel is free and there is no objection to establishing a connection to S4. As S4 is also situated outside the range of S1 and S2, the same holds for S4 and, therefore, the connection can be established without any problems occurring. If the two stations are within range of the existing connection between S1 and S2, S3 will find an occupied receiving channel—as S1 maintains contact with S2 at the frequency fa, which is then also received by S3. S3 will then return to the search phase. However, S3 may be in such a position that it is not capable of receiving S1 transmitting at frequency fa, as, for example, there is an obstacle O in the transmission path between S1 and S3. The station S3 will then find a free receiving channel and proceed to transmitting a calling code, i.e. the address code, for S4 at the frequency fb. There is a possibility now that the called station S4 is situated at a spot where it can receive at frequency fb both the signals from S3 (with the relevant address code) and the signals from S2. Then it depends on the local situation which one of these so-called co-channel signals is weaker and will possibly be suppressed. If the signal from S3 is the weaker signal on reception, the calling code will not be recognised and there will not be any connection between S3 and S4. On the other hand, if the signal from S3 is the stronger on reception, S4 will transmit a verification signal to S3 at frequency fa to acknowledge the reception of this calling code and the connection between S3 and S4 is made final, that is to say, the signalling phase has ended and the exchange of information can commence. If the mutual interference S2-S4 is sufficiently strong, however, not only the newly set up connection can be made useless by mutilation, but also the running conversation over the already existing connection S1-S2 can be disturbed such that it has to be broken off, which, needless to say, is unacceptable. The latter will more specifically be the case if S2 has a stronger reception of S4 than S2 has of S1.

These problems can be avioded if the station S4 is enabled to alternately listen to S2 and S3 after recognising its own address code for the realization of the connection with S3. This is possible by creating a listening slot for S4 in which this station listens to any signals transmitted by S2 at frequency fb. Despite the fact that the address code is received by S4 it may nevertheless be decided not to establish a connection S3-S4. Generally speaking it may be observed that apart from the calling station (S3) checking first in the usual manner whether the one duplex channel is free (fa) before transmittng a call over the other "unchecked" channel (fb), the suggested procedure makes it also possible to check, from the called station (S4), the condition of this other channel (fb), after which a verification signal acknowledging or rejecting the connection is transmitted to the calling station S3 (at the frequency fa) dependent on the condition of this other channel (fb). Sampling of the duplex circuit is carried out both from the two stations (S3, S4) and for the two channels (fa, fb) of the duplex circuit.

Two different procedures of creating a listening slot are described below. According to the first procedure, the transmitter of the calling station S3 in the signalling phase operates intermittently, that is to say at a predetermined repetition frequency S3 transmits signals provided with the desired address code, in this case the S4 address code. Let it be assumed that the time required for an address code is 10 ms, then a transmitting time of, for example, 12 ms will have to be reckoned with, considering the signal-rise time of the transmitter, followed by a "transmitter off" period or rest period of, for example, 10 ms. To prevent the time intervals during which the address code is to be recognized by the called station coinciding by mere chance with the rest periods between the transmissions from S3, consequently wasting a call completely, the sampling time should always be longer than the rest period of the transmitter.

Figure 2A:
FIG. 2 shows a number of diagrams with reference to which the operation and procedure of the automatic channel selection system in its two embodiments of the invention will be explained.
Figure 2B:
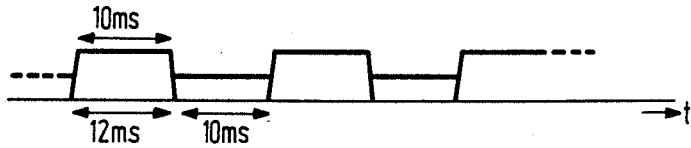
Figure 2C:
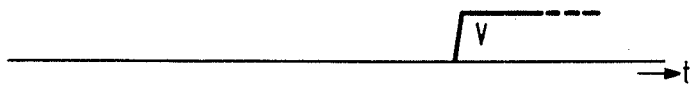

FIG. 2A is a representation of the level of the signal (supposed to be constant) coming from S2 and received by S4. FIG. 2B is a representation of the signals coming from S2 and S3 and being alternately received by S4, the signals coming from S3 and comprising the S4 address code being stronger than the signals coming from S2. Depending on the ratio of strength of the two signals or depending on the presence of signals coming from S2, station S4 will send a verification signal V to S3 acknowledging or rejecting the connection (see FIG. 2C).

According to the second procedure the station S3 continues to transmit the address code for S4 until the station S4 has recognized its address code and transmits a control signal P for the station S3 at the frequency fa, after which the latter stops transmitting. Thus, a listening time is created initiated by S4.

Figure 2D:
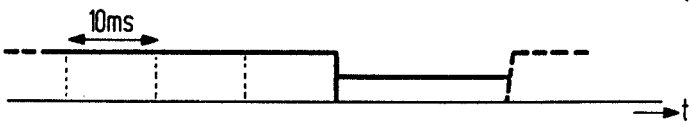
Figure 2E:
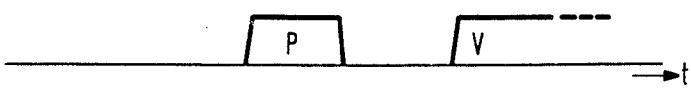

FIG. 2D is a representation of the signals received by S4, initially coming from S3 for some periods of time and not coming from S2 until S4 has transmitted control signal P for S3. Here again station S4 will emit a connection acknowledge or a connection-reject verification signal to S3 (see: FIG. 2E), depending on the ratio of strength of the two signals or depending on the presence of signals coming from S2. Consequently, this second procedure requires an additional message, that is to say, the control signal P. In either case the signalling phase is terminated by the connection-acknowledge or connection-reject-verification signal V after which a final connection has been effected or not effected for information exchange.

Although only four stations have been referred to in the aforesaid embodiment of the invention, naturally a plurality of stations having duplex channels tuned to the frequencies fa and fb can be incorporated. However, if it comes to solving problems, arising when in addition to a communication between a first and a second station a connection has to be established between a third and a fourth station, it will be sufficient to reduce the system to four stations.

The method described above has been realised in an automatic channel selection system, each station comprising a prior art duplex transmit/receive arrangement and scanning circuits for scanning all receiving channels in the duplex band assigned to the relevant station, searching for the address code assigned to the relevant station. It is likewise known to provide switching circuits for rendering the scanning means inoperative if a connection to another station is to be initiated or if the address code assigned to the relevant station is recognised. It is also kown to provide switching circuits for energizing the transmitter if a free receiving channel has been found for establishing a connection to another station or if a verification signal is to be transmitted after the address code assigned to the relevant station has been recognised.

In a first embodiment of the invention each station of the automatic channel selection system comprises further switching circuits, intermittently activating at a certain repetition frequency the transmitter of the calling station, if the transmitter is energized, once a free channel has been found. Similar transmitter modulation means are well-known to a person skilled in the art and do not require further explanation.

In a second embodiment of the invention each station of the automatic channel selection system comprises further switching circuits which are activated by the control signal P, transmitted by the called station after recognition of the relevant address code, and which cause the transmitter of the calling station to be switched off in order to enable the called station to determine whether a final connection can be or cannot be effected. The application of the aforesaid switching circuits is likewise within grasp of an expert in this field and does not need any further explanation.

What is claimed is:

1. A method of sharing a predetermined number of duplex channels in a frequency band of an automatic channel selection system, said system comprising a plurality of stations, each station comprising a transmitter and a receiver, and being assigned a plurality of receiving channels in a duplex band, and a respective transmitting channel corresponding to each receiving channel,
   in a resting condition each station searching for its own address code by continuously scanning all channels of said plurality assigned to it, and
   said method comprising a signalling phase for setting up a connection between a first, calling station and a second called station, including the following steps:
   (a) the calling station changes from scanning said receiving channels assigned to it in a search for its own address code, to scanning for a free receiving channel,
   (b) in response to finding a free receiving channel, the calling station transmitter starts transmitting at the frequency of the transmitting channel corresponding to said free channel, and transmits the address code of the called station,
   (c) the called station continuously scans the channels of said plurality assigned to it, and in response to the called station receiving and identifying its own address code, the called station transmitter starts transmitting a verification signal to the calling station over said free channel,
   (d) the calling station receives said verification signal and commences exchange of information with the called station,
   characterized by providing a listening slot in the signalling phase, in said slot said called station listening for signals from stations other than the calling station on the channel over which the address code was transmitted, and, responsive to receipt of such signals from stations other than the calling station, transmitting a negative verification signal over said free channel for inhibiting establishment of a final connection over the duplex channel pair which includes said free channel.

2. A method as claimed in claim 1, characterized in that the calling station transmitter operates intermittently in the signalling phase.

3. A method as claimed in claim 2, characterized in that said continuously scanning utilizes a sampling time longer than a rest period between intermittent transmission signals of the calling station.

4. A method as claimed in claim 1 characterized in that, response to receipt and identification by a called station of its own address on a given channel, the called station transmits a control signal for the calling station over the duplex channel corresponding to said given channel, and upon receipt of said control signal, the calling station stops transmitting signals containing the address code of the called station.

5. An automatic channel selection system for sharing a predetermined number of duplex channels in a frequency band in accordance with the method claimed in claim 1, said system comprising a plurality of stations, and each of said stations comprising: a duplex transmit/receive arrangement including a transmitter and scanning means for scanning all receiving channels in the duplex band assigned to the respective station,
   first switching means for rendering the respective scanning means inoperative when a connection to another station is to be initiated and when the address code assigned to the respective station is received and identified, and
   second switching means for activating the transmitter when a free channel has been found for establishing a connection to another station, and when a verification signal is to be transmitted responsive to receipt and identification of the address code assigned to the respective station,
   characterized by comprising third switching means for interrupting a transmission signal from the respective station, when said station is acting as the calling station, responsive to receipt of a control signal from the called station.

6. A system as claimed in claim 5, characterized in that said third switching means comprises means for operating said calling station transmitter intermittently at a predetermined repetition frequency, responsive to finding a free receiving channel.

7. A system as claimed in claim 5, characterized in that, responsive to receipt and identification of its assigned address code, a called station transmits a control signal on the corresponding duplex channel, and
   responsive to receipt of said control signal, said third switching means renders the calling station transmitter inoperative until after receipt of a verification signal, thereby enabling the called station to inhibit making a final connection by transmitting, or failing to transmit, the verification signal.

8. A station for incorporation in an automatic channel selection system operating in accordance with the method claimed in claim 1, comprising:
   a duplex transmit/receive arrangement including a transmitter and scanning means for scanning all receiving channels in the duplex band assigned to this station, first switching means for rendering the scanning means inoperative when a connection to another station is to be initiated and when the address code assigned to this station is received and identified, and second switching means for activating the transmitter when a free channel has been found for establishing a connection to said another station, and when a verification signal is to be transmitted responsive to receipt and identification of the address code assigned to this station, characterized by comprising third switching means for interrupting a transmission signal from this station, when this station is acting as the calling station, responsive to receipt of a control signal from the called station.

9. A system as claimed in claim 5, characterized in that said third switching means comprises means for operating this station transmitter intermittently at a predetermined repetition frequency, responsive to finding a free receiving channel.

10. A system as claimed in claim 5, characterized in that, responsive to transmission of said another station's address code, and receipt of a control signal on the corresponding duplex channel, said third switching means renders this station transmitter inoperative until after receipt of a verification signal, thereby enabling said another station to inhibit making a final connection by transmitting, or failing to transmit, the verification signal.

* * * * *